Patented Nov. 27, 1928.

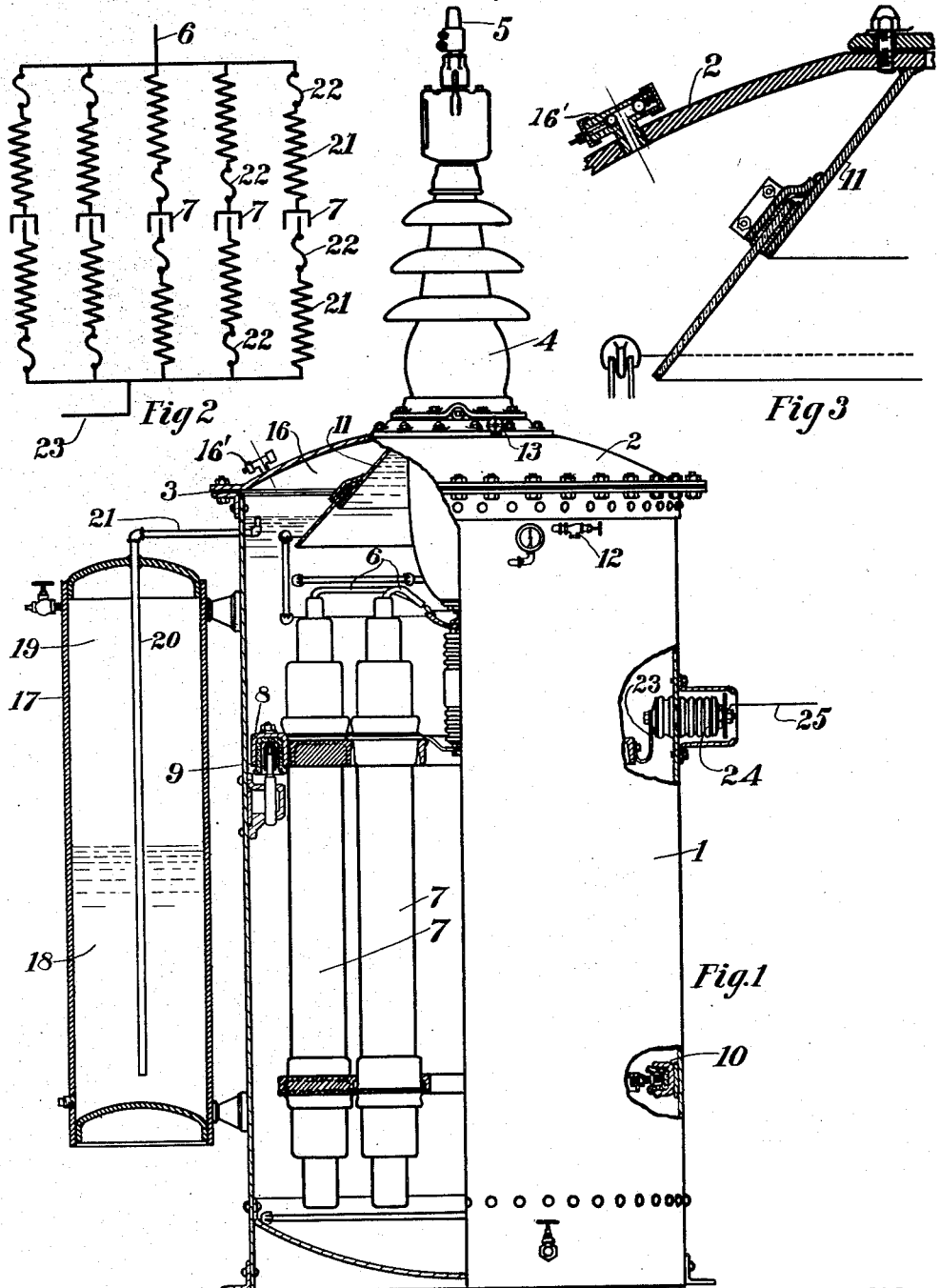

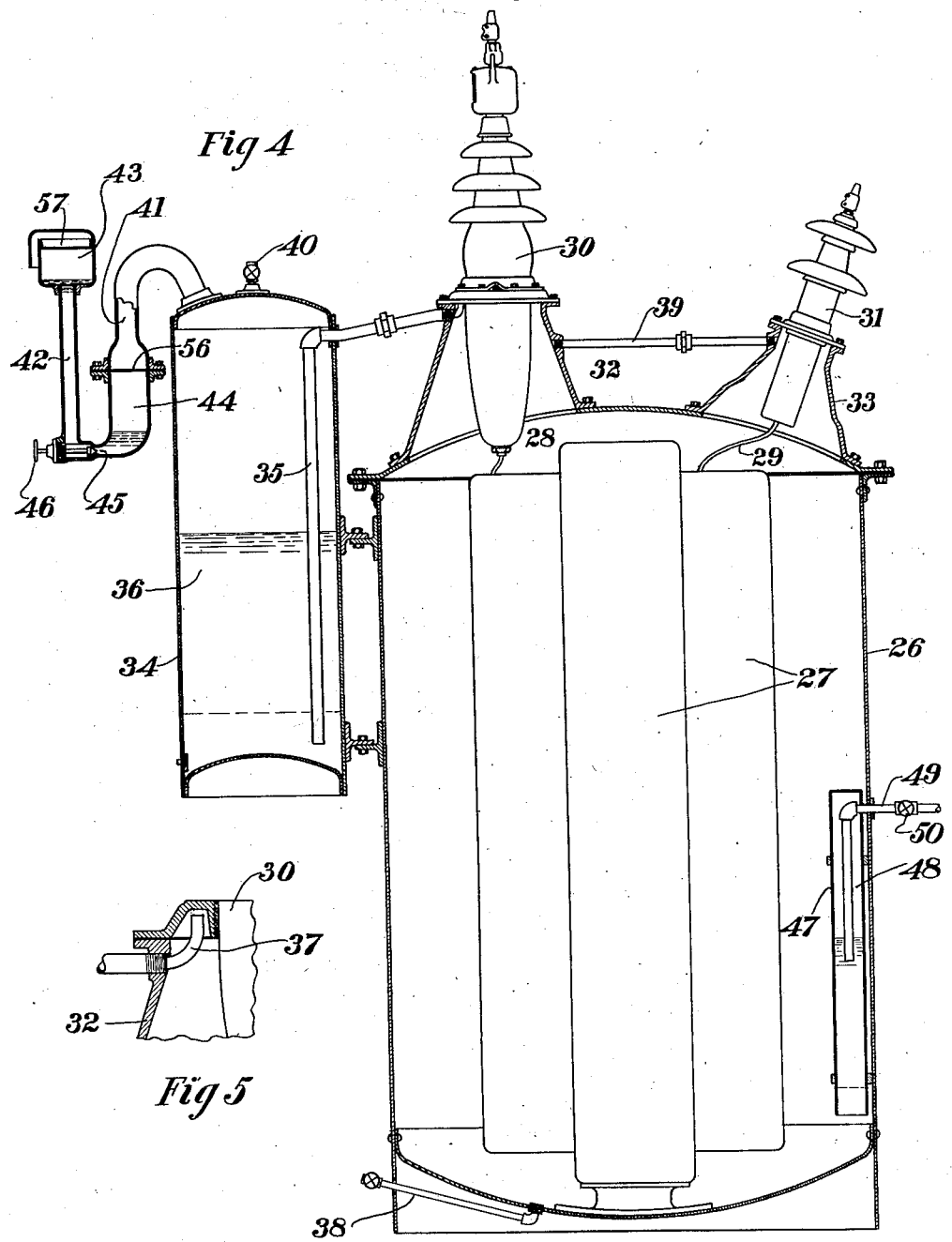

1,693,430

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

CASING FOR ELECTRICAL APPARATUS.

Application filed June 25, 1924. Serial No. 722,204.

This invention relates to improvements in oil containing cases or tanks used for transformers, circuit breakers, oil switches, electrostatic condensers or other electrical apparatus where the dielectric strength of oil is an important factor in determining the size and reliability of the apparatus. The object of the invention is to provide a casing of the class named in which there shall be improved electrical and mechanical characteristics and in which oil will be protected from contamination without endangering the apparatus or casing.

The invention is exemplified in the combination and arrangement of parts shown in the accompanying drawing and described in the following specification, and more particularly pointed out in the appended claims.

In the drawing—

Fig. 1 is an elevation with parts broken away and other parts in section showing one embodiment of the present invention.

Fig. 2 is a diagram of electric wiring used in one form of apparatus.

Fig. 3 is a fragmentary sectional view showing a detail of construction.

Fig. 4 is a view similar to Fig. 1 showing the application of the invention to a condenser housing.

Fig. 5 is a detail section.

Figure 6:
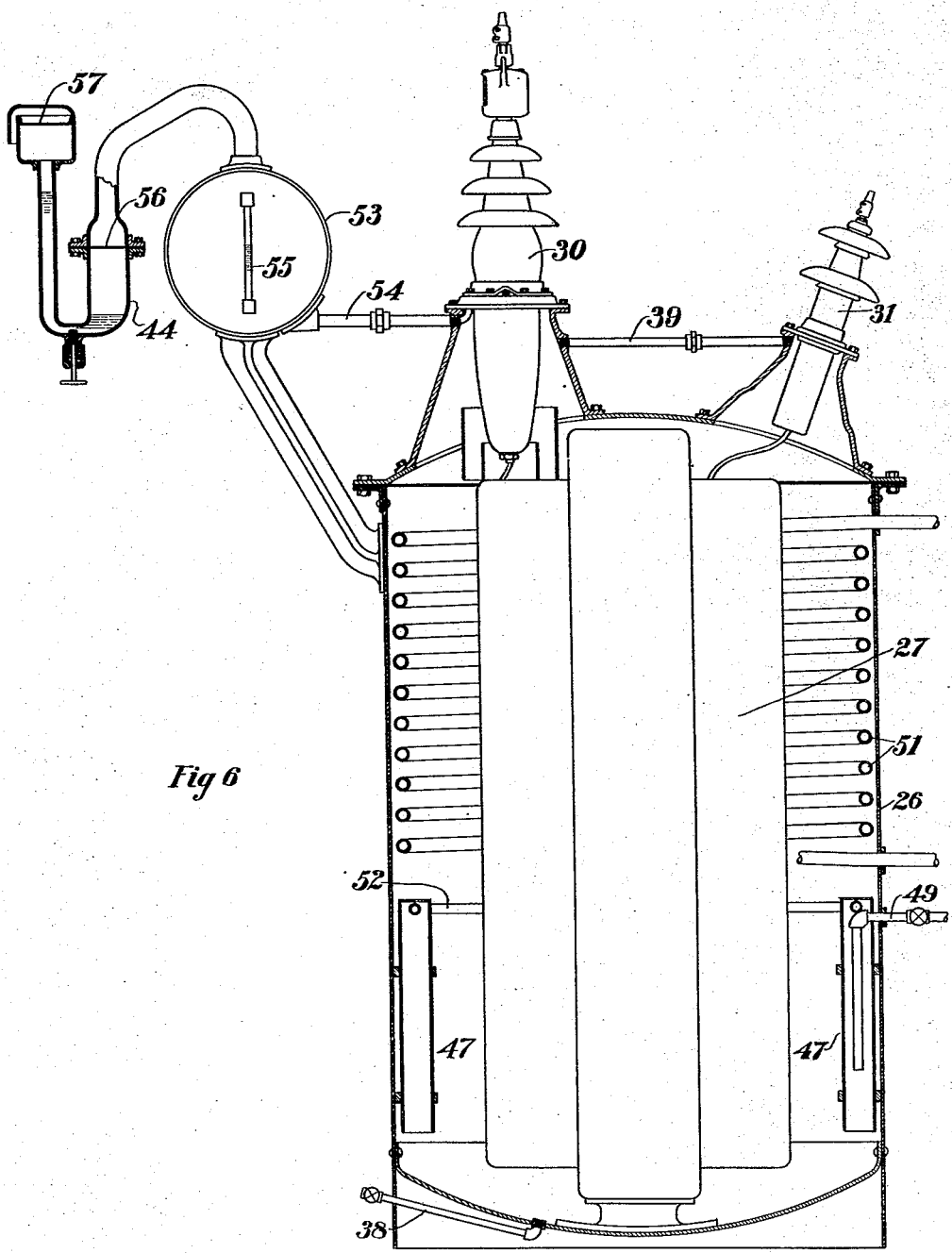
Fig. 6 is a view similar to Fig. 4 showing another form of the invention.

It is a well known fact that the oil level in transformers or other electrical apparatus rises with an increase in temperature and falls with a lowering of temperature. If the air space above the oil is connected to the outside air, a breathing action takes place which draws in fresh air as the oil level falls. In many localities this air may contain a considerable percentage of moisture, some of which may be taken up by the oil, reducing its dielectric strength very materially in the course of time.

This is particularly true where the temperature of the oil is at or below the temperature of the air at some times. This condition is likely to prevail in cases where the apparatus is idle or where there is little or no heat generated, as in the case of electrostatic condensers and oil circuit breakers. To remove this difficulty, a new type of tank or case has been provided. This case has several distinct advantages.

Fig. 1 shows the application to an electrostatic condenser which may be used for carrier current telephone or signal work, for impriving the power factor, for lightning protection, for coupling transmission lines together electrostatically or for other purposes for which the electrostatic condenser may be used.

The embodiment shown comprises a main case or tank 1, having a cover 2 which makes a tight fit by being clamped on a gasket 3.

The case is equipped with an entering bushing 4, which is connected with the transmission line or power system by lead 5. Electrical contact is made at 6 between the conductor 5 in the bushing and one plate of each of the condenser units 7.

The outer coating of the condenser is connected to the holding spider 8, which is insulated from the tank by insulators 9 and 10.

The insulators 9 take the vertical load and the insulators 10 maintain axial position of the condenser elements with respect to the tank. This construction provides a high degree of insulation and gives the necessary mechanical strength so as to hold the condenser elements in place during shipping or when being moved.

If that portion of the bushing 4 below the top of the case is covered with oil at all times, there is no danger of an explosion due to the ignition of a gas pocket by electrostatic discharge or from hot gases which may come up from below, as in the case of an oil circuit breaker or in case of electrical failure of a lead or a short circuit in any portion of the apparatus. In the case of some types of oil circuit breakers, hot gases may come to the surface due to the operation of the breaker.

Where the lower end of the bushing is covered with oil, it is also possible in many cases to use a bushing having a shorter end below the case, which greatly reduces the cost, particularly in bushings for high voltages. This is due to the fact that the greater dielectric strength of the oil as compared to air will prevent flashover and permit the use of a shorter bushing than can be used where the bushing is partially or entirely covered with air.

Owing to the expansion and contraction of the oil under changes in temperature, it is not possible to accomplish these results in the ordinary transformer case without incurring serious disadvantages. It is evident that an air pocket can be maintained above the oil and still keep the lower end of the bushing covered by making the cover concave on its outer side. While this provides good conditions below the top of the cover, the striking distance for the top of the bushing is decreased and a pocket is provided for water which must be drained.

Extending the metal flange of the bushing some distance below the cover will keep the insulating portion below the oil, but it is evident that the bushing must be increased in length to set up the same conditions. Furthermore, in this case a gas pocket is provided near the bushing which may be ignited in the case of oil circuit breakers or a short, although there is no possibility of charging current igniting the gas pocket due to the insulating surface being covered with oil.

To provide the essentials and still prevent breathing of the outside air, an improved construction has been adopted. A baffle or flange 11 is fastened preferably to the cover of the case. This baffle may be made of metal or insulating material or the upper portion may be metal and the lower portion of insulating material as shown in Fig. 3 of the drawing, the only essential being that the baffle is tight so as to prevent the leakage of air for a pressure due to a head of oil equivalent to its height and between its inner and outer surface.

This baffle must also be stiff enough so that it will not collapse under the difference in pressure on the two sides due to the difference in oil level on the two sides. It is evident that if there is pressure on the inside of the tank that this will not affect the pressure on the baffle, the only pressure being that due to the difference in oil level on the two sides.

If the case is provided with a valve 12 connected with the inside, air may be forced in through this valve to raise the pressure in the tank or case. This pressure will be indicated by the gauge. If a valve 13 connecting to the space between the baffle 11 and the lower end of the bushing is opened, the air in this space will escape with the increase in pressure, providing there is sufficient oil in the case, the oil level outside of the baffle being lowered. When the oil begins to run out of valve 13, it is closed tightly. If then further pressure is applied, the air in the expansion pocket 16 will be compressed. This pressure may be increased to a point so that there will still be atmospheric pressure at the lowest temperature of the oil. Where the case is sufficiently strong, a pressure considerably above atmospheric pressure may be maintained for any conditions. The increased pressure will tend to prevent electrical discharge in any air pocket and will also tend to prevent the diverting away of oil from insulating surfaces due to charging current under severe electrical conditions which may be brought about by surges or very high voltages. It is essential that the oil level in the pocket should not be below the edge of the baffle at its maximum contraction, which occurs at its lowest temperature. This construction has a material advantage in that a leak in the gasket or at any point between the attachment of the baffle will permit the escape of air only and not of oil. If the upper end of the baffle is attached to the bushing in place of the case, any leak between the bushing and the case will discharge air rather than oil. In some cases this permits a very material economy in the construction of the case and a great saving in the amount of oil.

It is evident that with the expansion of the oil the air will be compressed in the expansion pocket 16. When the temperature of the oil falls, the air in expansion pocket 16 will expand. If a sufficient quantity of air is pumped into this pocket, the pressure need not fall below the atmospheric pressure. It, of course, is essential that the tank remain tight.

If the apparatus contains moisture, it might be advisable to operate below atmospheric pressure, in order that the moisture may be more readily taken up by the oil. The oil can then be dried by the use of an oil filter or centrifugal agent or other means, at which point the apparatus can be operated at or above atmospheric pressure for all conditions.

It is evident that there will be no connection between the air in the pocket and the outside except that necessary to maintain a definite pressure. If there is no leakage, the loss in pressure would be exceedingly small and might be negligible on most pieces of apparatus. In some cases there may be an absorption of some of the constituents of the air by the oil or insulating fluid in contact with same. Where this absorption of any of these constituents of the air might be detrimental to the oil, it is evident that the construction is a decided advantage.

It is evident that by applying a sufficiently high pressure in the first place or by increasing the pressure at several different times, that a stable condition between the air and the oil would soon result without the use of a special gas over the top of the oil. A special gas can, of course, be used in the pocket, as this construction prevents the loss of same. This is a decided advantage as explosions or effects which may cause sludging of the oil may be prevented by the use of a proper gas in the air pocket. Under some conditions, the gas will soon establish practically a neutral condition without any special attention, providing there is no breathing action.

Owing to the fact that oil expands to such a degree that there may be a considerable change in volume with temperature, a very considerable amount of new air will come in contact with the oil under ordinary conditions unless this pumping action is prevented by the use of a sealed case such as that provided by the present invention. In transformers the changes in temperature between night and day and different times of the year will change the volume of the oil materially. As the load on the transformer also affects the temperature of the oil, a change in the load may cause a material difference in the oil level with a resulting breathing action. This is not so serious where the temperature of the oil is above the dew point of the air, although contact with new air may affect the chemical composition of the oil. In apparatus where the loads are negligible, compared to radiation, it is evident that the oil may be at a lower temperature than the air; hence, if moist air comes in contact with the oil it will condense and take up the water readily. Apparatus such as oil switches, electrostatic condensers or current transformers are likely to be detrimentally affected by this action, for it would be necessary to remove the water from the oil occasionally or to provide a greater factor of safety so as to permit the use of oil having poor insulation.

In addition to the air space shown at 16 a tank 17 may be provided. The tank 17 is partially filled with oil as shown at 18, leaving an air space 19 at the upper portion of the tank. A pipe 20 extends to a position near the bottom of the tank and forms an air tight connection with the tank cover where it passes outwardly therefrom. The upper end of pipe 20 is provided with a section 21 communicating with the air chamber 16. It is apparent that the pressure within the housing 1 will be communicated to the tank 17. In case of expansion of the oil in the housing 1, the air in the space 19 will be compressed to compensate for the expansion of the oil in the housing. If the oil in the housing contracts, the air in space 19 will expand to force more oil from the tank 17 through the pipe 20 into the housing 1; thus a greater capacity for expansion is provided than would be secured by the chamber 16 alone. The chamber 16 provides a cushion to absorb the force of any sudden pressure within the housing 1 and also forms an air pocket at the top of the tank so that in case of leakage air and not oil will escape.

The cover for the tank 1 may be provided with a both way safety or pop off valve 16' as shown in Fig. 3 for relieving excessive pressure or vacuum within the tank. These valves may be adjustable as shown. The intake valve may be set to operate, at any point below atmospheric pressure as desired. The other valve may be set to relieve pressure above a given value. For all fluctuation that does not exceed these values there will be no action of the valves and hence no breathing action.

The wiring diagram shown in Fig. 2 illustrates the manner of connecting the condenser units 7 in parallel with one another. In some cases it may be advisable to insert resistances 21 in series with the elements of the condensers, and fuses 22 may also be employed. In case of failure of one of the condenser units, a short circuit will result opening the connection of that unit by blowing one or both of the fuses connected with the respective elements of the unit. The resistances in series with the condenser elements will tend to prevent surges in the other units in case one of the units fails or if sudden changes in voltage are produced by other causes. It will be understood, of course, that the resistances and fuses may be used on one side only of the condenser and that either may be used separately from the other. The Spider 8 connected with the outer elements of the condenser unit 7 is provided with a lead 23 extending thru bushing 24 and connected with a lead 25 which may communicate with signaling apparatus or other devices which it is desired to connect to the high potential line thru the transformer.

In Fig. 4 there is shown a transformer housing 26 having transformer windings 27 connected to leads 28 and 29. The leads are carried out thru bushings 30 and 31 respectively, the bushings being supported on pedestals 32 and 33, mounted on top of the housing 26. The pedestals 32 and 33 provide chambers surrounding the lower end of the bushings and communicated with the interior of the housing. A sealed tank 34 is supported at one side of the housing 26 and is connected by pipe 35 to the upper portion of the space within the pedestal 32. The tank 34 is partly filled with oil or other insulating compound 36 and the pipe 35 opens near the bottom of the tank. The upper end of the pipe 35 is provided with a goose neck 37 which opens at the top of the space within the pedestal 32. The housing 26 is filled with oil thru a connection 38 at its lower end so that during filling, the air within the housing will be forced out thru the pipe 35 permitting the oil to completely fill the space around the lower end of bushing 30. Pipe 39 connects the interiors of the pedestals 32 and 33 so that during filling of the housing, the air will be forced from the pedestal 33 thru the connection 39 into the pedestal 32 and then out thru the pipe 35. The oil 36 forms a seal for the housing 26 so that the oil will be maintained in the pedestals 32 and 33. The interior of the system may be placed under any desired pressure thru a valve 40 at the top of the tank 34. A safety U tube 41 is connected with the top of the tank 34 and the pressure within the tank 34 is balanced by a column of liquid 42, the upper surface of which is open to atmosphere within an enlarged cup 43 at the top of the column.

The leg 44 of the U tube has a considerably greater diameter than the column 42, to permit considerable range of pressure without greatly raising the surface of the sealing liquid 42 about the bottom of the U tube. When excessive pressure occurs in the housing 26, such as may be produced by over heating, short circuits or other causes, the liquid in the leg 44 will be forced down to the bottom of the U tube thus permitting the escape of a sufficient amount of air to relieve the pressure in the system. The orifice 45 thru which the air escapes is controlled by a valve 46 and is, preferably, comparatively small so that the air will escape thru the leg 42 without raising the entire column of liquid with the leg. The cup 43, however, has sufficient capacity to retain the liquid so that after the pressure has been relieved, the safety U tube will automatically restore itself.

In many installations the windings do not conform to the contour of the transformer housings. Where this is the case, advantage may be taken of the extra space within the housing for a compression tank such as that shown at 47. This tank is open at its lower end and provides a pocket 48 in its upper portion for air or gas. A pipe 49 is provided having a valve 50 thru which the pressure in the tank 47 will be controlled. This compression chamber 48 will provide additional facility for expansion and contraction of the oil at the housing 26. At the same time it will effect an economy of oil since it occupies space which it would otherwise be necessary to fill with the insulating oil.

In Fig. 6 there is shown a construction similar to that of Fig. 4. In this instance however the transformer housing is shown as provided with cooling coils 51 and a plurality of compression tanks 47 are provided below these coils. These tanks are connected at their tops by pipe 52. The compression tank 53 in this instance is raised above the top level of the oil in the housing and is connected with the interior of the housing by means of a conduit 54. The tank 53 may be a horizontally extending cylinder partially filled with oil as indicated by the gauge glass 55. This will maintain a liquid head on the housing 26 which may be augmented by gas or air pressure in the top of the tank 53. A U-tube seal or trap 44 similar to that in Fig. 4 seals the tank 53 to atmosphere and provides a safety blowout to take care of pressure too great to be taken care of by the resiliency of the gas in the tank 53. In the U-tubes in both instances porous diaphragms 56 and 57 are provided of suitable material such as chamois skin or other substance that will permit passage of air but prevent overflow of the liquid.

I claim—

1. In combination a housing, a conductor bushing extending through the top of said housing, a baffle forming a compartment surrounding said conductor bushing and providing an air pocket adjacent to the top of said housing outside of said compartment, a dielectric fluid disposed within said housing and sustained in said compartment by gas pressure within said pocket, a supplemental tank disposed outside of and below the top of said housing and having dielectric fluid therein, the surface level of which is below the surface level of the fluid in said housing, and a pipe opening into said air pocket and having one end thereof disposed below the liquid in said supplemental tank.

2. In combination a sealed housing, electrical apparatus disposed within said housing, an insulating liquid surrounding said apparatus, there being a gas pocket adjacent to the top of said housing, an auxiliary chamber having communication with said housing and provided with a gas pocket therein, and a liquid seal separating the gas pocket in said housing from the gas pocket in said auxiliary chamber.

3. In combination a tank having a cover therefor, a conductor bushing extending through said cover, a baffle forming tight connection with said cover and extending inwardly therefrom to separate the space adjacent to said cover into two compartments, means for venting the compartment adjacent said conductor bushing to permit said compartment to be filled with liquid, the other compartment formed by said baffle being arranged to contain gas under pressure to support the liquid in the compartment adjacent said conductor bushing and a maximum and minimum pressure pop-off valve for limiting the range of pressure in said gas compartment.

4. In combination a sealed tank, a conductor bushing extending through the top of said tank, electrical apparatus arranged within said tank, a baffle surrounding said bushing and spaced outwardly therefrom, said baffle having the lower portion thereof composed of dielectric material, means for venting the space within said baffle and adjacent said bushing and means for supplying gas under pressure through the space at the top of said tank outside of said baffle.

In testimony whereof I have signed my name to this specification on this 21st day of June A. D. 1924.

ARTHUR O. AUSTIN.